United States Patent
Lin et al.

(10) Patent No.: US 10,146,381 B2
(45) Date of Patent: Dec. 4, 2018

(54) TOUCH SENSING STRUCTURE AND APPLICATIONS THEREOF

(71) Applicant: Innolux Corporation, Chu-Nan, Miao-Li County (TW)

(72) Inventors: Yu-Chien Lin, Chu-Nan (TW); Chuan-Chi Chien, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 63 days.

(21) Appl. No.: 15/148,511

(22) Filed: May 6, 2016

(65) Prior Publication Data
US 2016/0328039 A1  Nov. 10, 2016

(30) Foreign Application Priority Data
May 8, 2015 (CN) .......................... 2015 1 0232474

(51) Int. Cl.
   *G06F 3/041* (2006.01)
   *G06F 3/044* (2006.01)

(52) U.S. Cl.
   CPC .... *G06F 3/044* (2013.01); *G06F 2203/04103* (2013.01); *G06F 2203/04111* (2013.01)

(58) Field of Classification Search
   CPC ........... G06F 3/044; G06F 2203/04103; G06F 2203/04111
   USPC ....................................................... 345/173
   See application file for complete search history.

(56) References Cited

U.S. PATENT DOCUMENTS

| | | | | |
|---|---|---|---|---|
| 2014/0070350 A1* | 3/2014 | Kim | ......................... | G06F 3/044 257/432 |
| 2015/0001060 A1* | 1/2015 | Kim | ......................... | G06F 3/044 200/600 |
| 2015/0015517 A1* | 1/2015 | Zhao | ....................... | G06F 3/041 345/173 |
| 2015/0160747 A1* | 6/2015 | Kohara | .................... | G06F 3/044 345/173 |
| 2015/0277186 A1* | 10/2015 | Zou | ...................... | G02F 1/13338 345/174 |

FOREIGN PATENT DOCUMENTS

| CN | 101943970 A | 1/2011 |
| CN | 102541355 A | 7/2012 |
| CN | 102566116 A | 7/2012 |

OTHER PUBLICATIONS

Chinese Office Action dated Jun. 5, 2018.

* cited by examiner

*Primary Examiner* — Jonathan Blancha
(74) *Attorney, Agent, or Firm* — Rabin & Berdo, P.C.

(57) ABSTRACT

A touch sensing structure including a transparent substrate and at least one touch sensing unit disposed on the transparent substrate is provided. Each touch sensing unit includes a first patterned electrode, a second patterned electrode, a conductive bridge and a patterned light-shielding layer. The second patterned electrode is isolated from the first patterned electrode and is separated into a first portion and a second portion by the first patterned electrode. A conductive bridge electrically connects the first portion and the second portion and is spatially separated from the first patterned electrode. The patterned light-shielding layer is disposed between the conductive bridge and the inner surface and at least partly overlaps the conductive bridge along a direction normal to the transparent substrate.

9 Claims, 13 Drawing Sheets

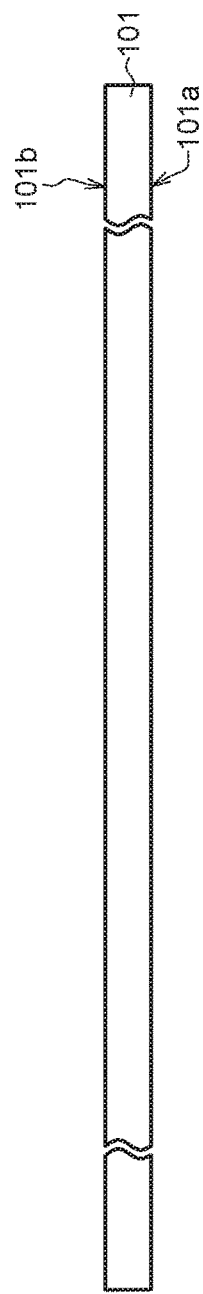
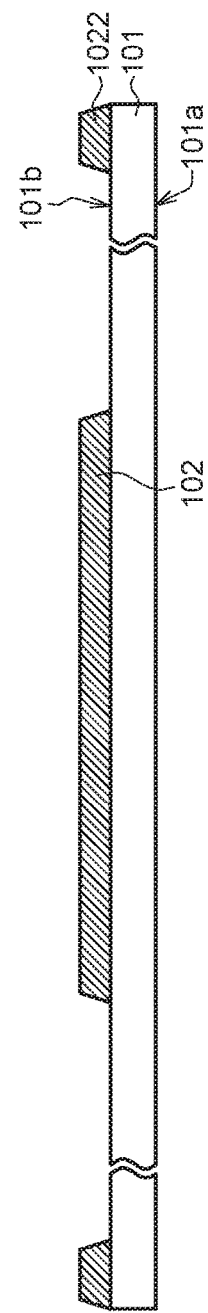
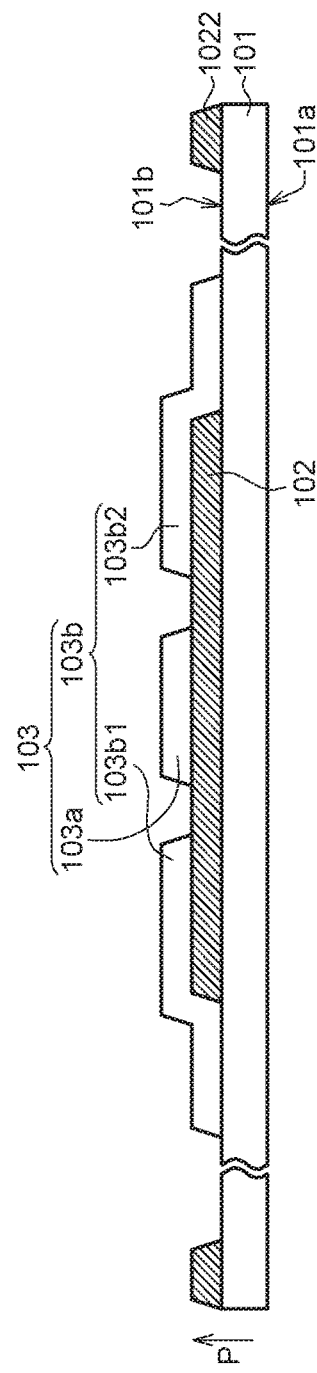
FIG. 1A
FIG. 1B
FIG. 1C

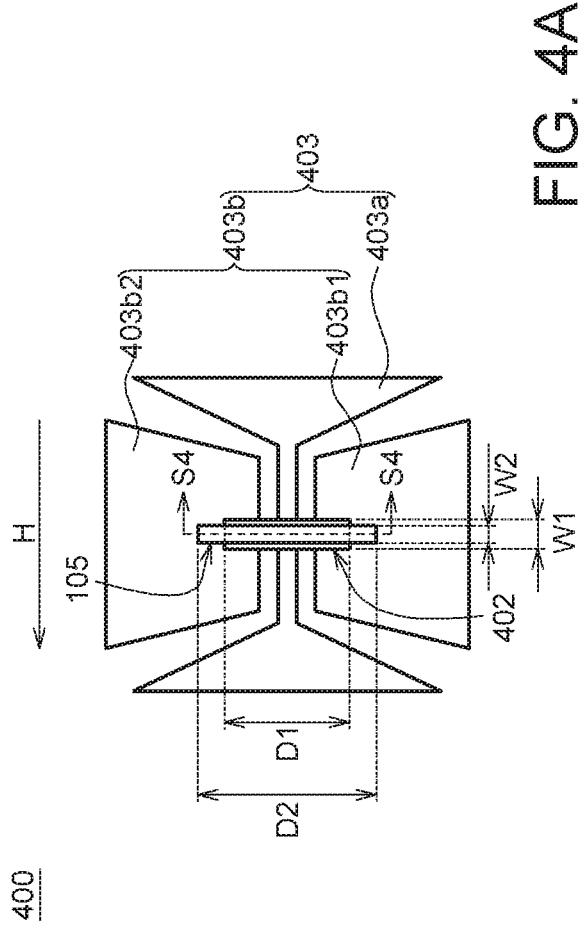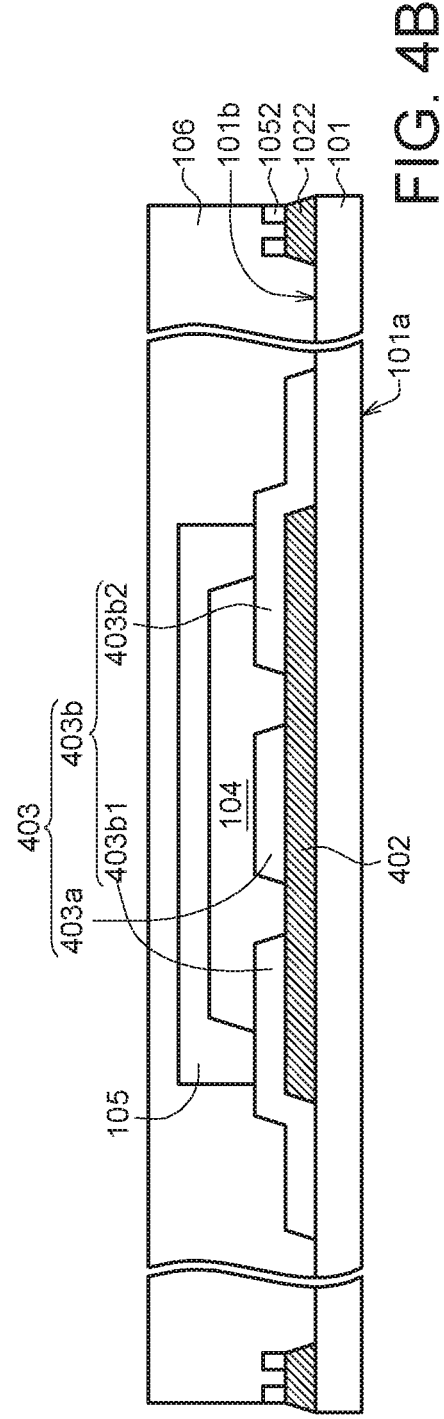

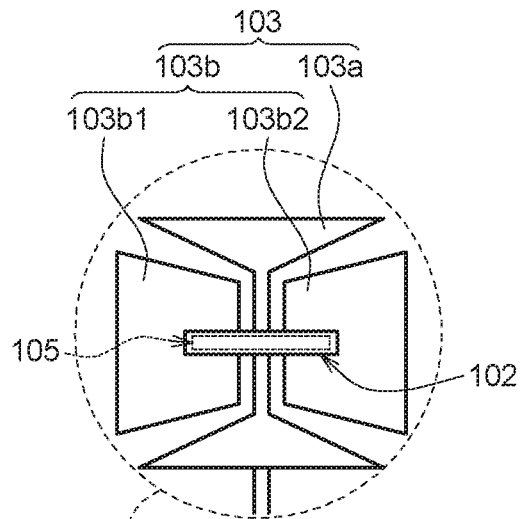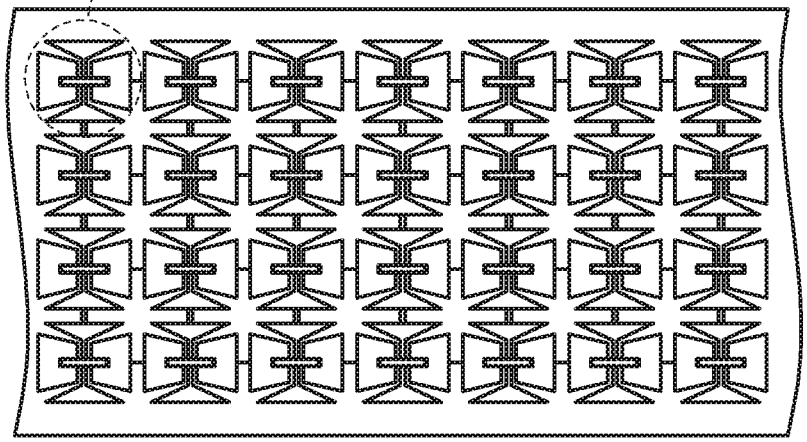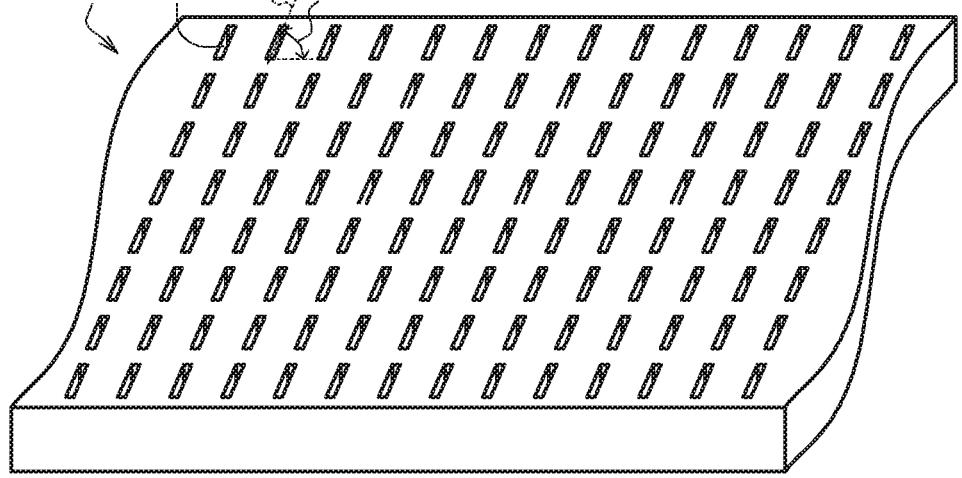
FIG. 11

TOUCH SENSING STRUCTURE AND APPLICATIONS THEREOF

This application claims the benefit of People's Republic of China application Serial No. 201510232474.3, filed May 8, 2015, the subject matter of which is incorporated herein by reference.

BACKGROUND OF THE INVENTION

Field of the Invention

The present disclosure relates in general to a touch sensing structure and applications thereof, and more particularly to a touch sensing structure with a light-shielding layer and applications thereof.

Description of the Related Art

Because of the advance in display technology, a touch sensing device has been widely used in various display devices. The touch sensing device provides intuitive operation to the users. A user can operate a display device with the touch sensing device through his/her hand gesture or by directly clicking a selection icon displayed on the screen.

Take for example, a capacitive touch device typically includes a substrate and a plurality of first sensing electrodes extending along a first axis and a plurality of second sensing electrodes extending along a second axis. Two adjacent first sensing electrodes are connected by a wire. Two adjacent second sensing electrodes are respectively disposed on two sides of the wire and are connected by a conductive bridge crossing the wire. The conductive bridges and the wires are electrically insulated from each other. The conductive bridges are made of a metal and have high reflectivity, such that incident light coming from external environment may be reflected by the conductive bridges. The user may perceive many bright spots on the surface of a touch display device due to reflection of the external light, and the display quality of the touch display device is deteriorated.

Therefore, it is a prominent task for the industries to provide an advanced touch sensing structure and applications thereof to resolve the problems.

SUMMARY OF THE INVENTION

According to a first aspect of the present disclosure, a touch sensing structure is provided. The touch sensing structure includes a transparent substrate and at least one touch-sensing unit disposed on the transparent substrate. The touch-sensing unit includes a first patterned electrode, a second patterned electrode, a conductive bridge and a patterned light-shielding layer. The second patterned electrode is separated from the first patterned electrode. The conductive bridge electrically connects with the first portion and the second portion and is spatially insulated from the first patterned electrode. The patterned light-shielding layer is disposed between the conductive bridge and the transparent substrate and at least partly overlaps the conductive bridge along a direction normal to the transparent substrate.

According to a second aspect of the present disclosure, a touch display apparatus is provided. The touch display apparatus includes the aforementioned touch sensing structure and a display panel disposed on one side of the touch sensing structure.

According to a third aspect of the present disclosure, a patterned display structure is provided. The patterned display structure includes a metal layer with a metal surface, a light shielding layer, and a glass substrate disposed on the light shielding layer. The light shielding layer is disposed on the metal surface, and has a plurality of openings for exposing a portion of the metal surface and a plurality of light-shielding portions to collectively define a plurality of display patterns in the light shielding layer. The radial dimension of each light-shielding portion is substantially smaller than 100 micrometers ($\mu m$).

As discussed above, a touch sensing structure and a touch display apparatus using the same are provided in the embodiments of the present disclosure. A patterned light-shielding layer is disposed between an inner surface of a transparent substrate (cover lens) and a conductive bridge of a touch sensing electrode in a manner of at least partly overlapping the conductive bridge to block an external light passing through the transparent substrate from reaching to and then being reflected by the conductive bridge. Though adjusting the overlapping position and overlapping size between the conductive bridge and the patterned light-shielding layer, the problems of bright spots due to the reflection of the external light can be mitigated, and the display quality of the touch display apparatus can be improved.

BRIEF DESCRIPTION OF THE DRAWINGS

The above and other aspects of the present disclosure will become better understood with regard to the following detailed description of the preferred but non-limiting embodiment(s). The following description is made with reference to the accompanying drawings.

FIGS. 1A to 1E are series of partial cross-sectional views illustrating the processing structures for forming a touch sensing structure according to an embodiment of the present disclosure;

FIG. 4A is a top view illustrating part of a touch sensing structure manufactured by the method described in FIGS. 1A to 1E according to another embodiment of the present disclosure;

FIG. 4B is a cross-sectional view illustrating part of the touch sensing structure taken along the cutting line S4 depicted in FIG. 4A;

FIG. 11 is an explode perspective view illustrating a touch display apparatus according to an embodiment of the present disclosure;

DETAILED DESCRIPTION OF THE INVENTION

Figure 1D:
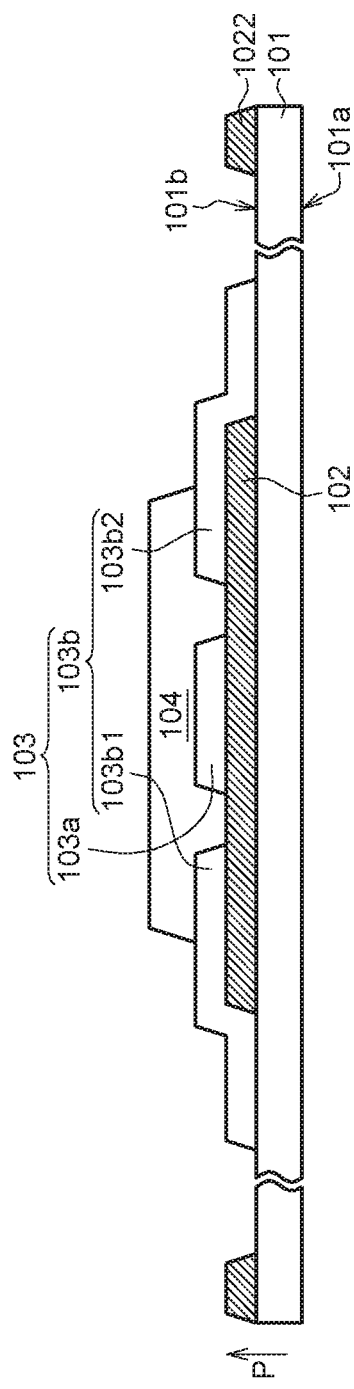

The present disclosure provides a touch sensing structure used in a display apparatus and applications thereof. Light interference due to the external light reflected by the touch sensing electrode can be mitigated by using the touch sensing structure, so as to improve the display quality of the touch display apparatus. The object, technical features and advantages of the present invention can be more easily understood by anyone ordinary skilled in the technology field, a number of exemplary embodiments are disclosed below with detailed descriptions and accompanying drawings.

It should be noted that these embodiments are for exemplification purpose only, not for limiting the scope of protection of the invention. The invention can be implemented by using other features, elements, methods and parameters. The preferred embodiments are merely for illustrating the technical features of the invention, not for limiting the scope of protection of. Anyone skilled in the technology field of the invention will be able to make suitable modifications or changes based on the specification disclosed below without breaching the spirit of the invention. Designations common to the accompanying drawings are used to indicate identical or similar elements.

FIGS. 1A to 1E are partial cross-sectional views illustrating the processing structures for forming a touch sensing structure 100 according to an embodiment of the present disclosure. The method for forming the touch sensing structure 100 includes following steps. Firstly, a transparent substrate 101 is provided (see FIG. 1A). In some embodiments of the present disclosure, the transparent substrate 101 can be realized by a light-permeable cover lens which can be touched or clicked by the user directly. In other words, the transparent substrate 101 can be realized by an ordinary glass substrate, alkali-free glass substrate (such as an LCD substrate), or a reinforced glass substrate processed with physical or chemical treatment (such as cover glass). The transparent substrate 101 can also be realized by a plastic substrate made of diethyl polyethylene terephthalate (PET), polycarbonate (PC), polymethyl methacrylate (PMMA), or polycycloolefin polymer (COP). In the present embodiment, the transparent substrate 101 has a touch surface 101a, and an inner surface 101b opposite to the touch surface 101a.

The touch surface 101a can directly contact the external environment or can be touched by the user directly.

Then, a patterned light-shielding layer 102 is formed on the inner surface 101b of the transparent substrate 101 (as shown in FIG. 1B). In some embodiments of the present disclosure, the patterned light-shielding layer 102 can be realized by a patterned photoresist layer or an ink material layer. In the present embodiment, firstly, a photoresist layer is formed on the inner surface 101b of the transparent substrate 101 by way of coating, press-printing or other suitable method. Then, a portion of the photoresist layer is removed by a lithography process to expose a portion of the inner surface 101b of the transparent substrate 101, so as to form the patterned light-shielding layer 102 as shown in FIG. 1B. In the present embodiment, during the forming of the patterned light-shielding layer 102, the portion of the photoresist layer remained near the edge of the transparent substrate 101 can serve as a light-shielding pattern 1022 to shield the metal traces 1052 formed at the edge of the transparent substrate 101 (the detail steps will be disclosed in the embodiments below). Therefore, in the manufacturing process, there is no need to have another process of forming another light-shielding layer to shield the metal traces 1052. In other words, the patterned light-shielding layer 102 and the light-shielding pattern 1022 can be formed in the same process, such that the manufacturing process can be simplified and the manufacturing cost can be reduced.

Then, at least one patterned electrode layer 103 is formed on the patterned light-shielding layer 102. In some embodiments of the present disclosure, the patterned electrode layer 103 can be realized by a transparent electrode layer such as a thin layer made of metal, metal nitride such as aluminum nitride (AlN), metal oxide such as indium tin oxide (ITO) or indium zinc oxide (IZO), graphene or nano-silver traces. The patterned electrode layer 103 includes at least one first patterned electrode 103a and at least one second patterned electrode 103b. The second patterned electrode 103b is isolated from the first patterned electrode 103a and is separated into a first portion 103b1 and a second portion 103b2 by the first patterned electrode 103a (see FIG. 1C in which a partial cross-sectional view the patterned electrode layer 103 is illustrated).

In the present embodiment, the first patterned electrode 103a and the second patterned electrode 103b are the same layer stratum. In other embodiments of the present disclosure, however, the first patterned electrode 103a and the second patterned electrode 103b can be disposed on different patterned electrode layers of different planes (not shown).

Next, a patterned dielectric layer 104 is formed on the patterned electrode layer 103 to cover at least one portion of the first patterned electrode 103a and at least one portion of the second patterned electrode 103b and partly expose the first portion 103b1 and the second portion 103b2 of the second patterned electrode 103b (see FIG. 1D).

After the dielectric layer 104 is formed, a conductive bridge 105 is formed above the dielectric layer 104. The dielectric layer 104 is disposed between the conductive bridge 105 and the first patterned electrode 103a, and the patterned metal layer 105 is spatially insulated from the first patterned electrode 103a through the dielectric layer 104. Two opposite sides of the conductive bridge 105 electrically connected with the first portion 103b1 and the second portion 103b2 respectively. The conductive bridge 105 crosses the first patterned electrode 103a. In other words, the conductive bridge 105 electrically connects to the first portion 103b1 and the second portion 103b2 of the second patterned electrode 103b, the dielectric layer 104 is disposed between the conductive bridge 105 and the first patterned electrode 103a, such that at least one touch sensing unit 100a can be formed therein. The conductive bridge 105 at least partly overlaps the patterned light-shielding layer 102 along a direction P normal to the transparent substrate 101 (that is, along the thickness direction of the transparent substrate 101).

In the present embodiment, the conductive bridge 105 is a patterned metal layer formed above the light-shielding layer 102. A portion of the same patterned metal layer can also serve as the metal traces 1052 of the touch sensing structure 100. In other words, the conductive bridge 105 and the metal traces 1052 of the touch sensing structure 100 can be formed in the same patterning process of the metal layer. However, such treatment may not be applicable to other embodiments of the invention.

Figure 1E:
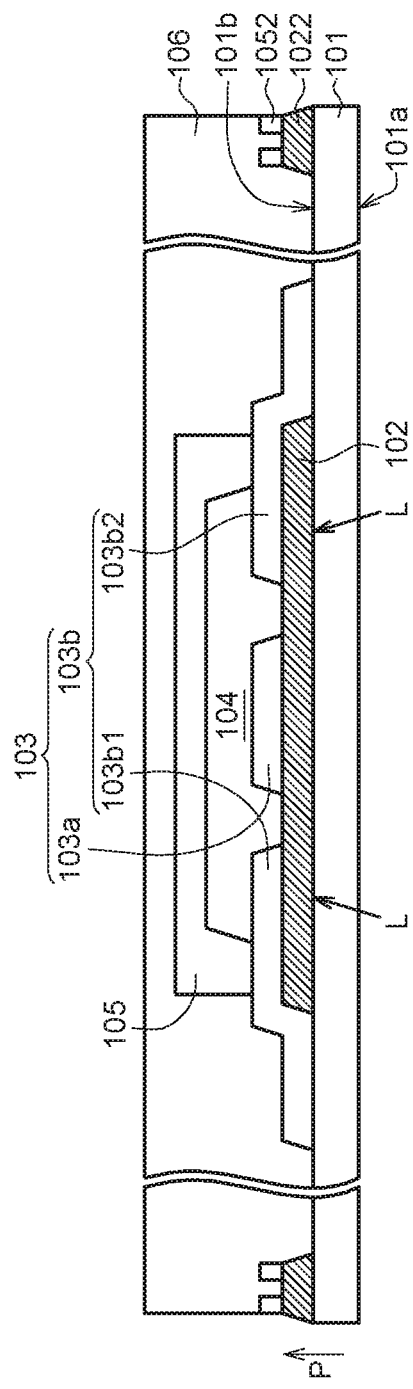

Then, the forming of the touch sensing structure 100 is completed through series of downstream processes such as forming a protection layer, forming a functional optical film, connecting a circuit board or assembly. As shown in FIG. 1E, a protection layer 106 is then formed on the conductive bridge 105. The protection layer 106 can be made of an organic or inorganic material. A single-layer or multi-layer film can be disposed between the patterned electrode layer 103 and the transparent substrate 101 to increase the transmittance or strength of the glass, wherein the single-layer or multi-layer film can be made of an organic material such as a high temperature resistant organic material (higher than 200° C.) or an inorganic material such as silicon oxide (SiOx) or silicon nitride (SiNx).

In some embodiments of the present disclosure, the touch sensing structure that is manufactured by the method illustrated in FIGS. 1A to 1E may achieve different optical effects through adjusting the overlapping position and overlapping size between the patterned light-shielding layer 102 and the conductive bridge 105.

Figure 2A:
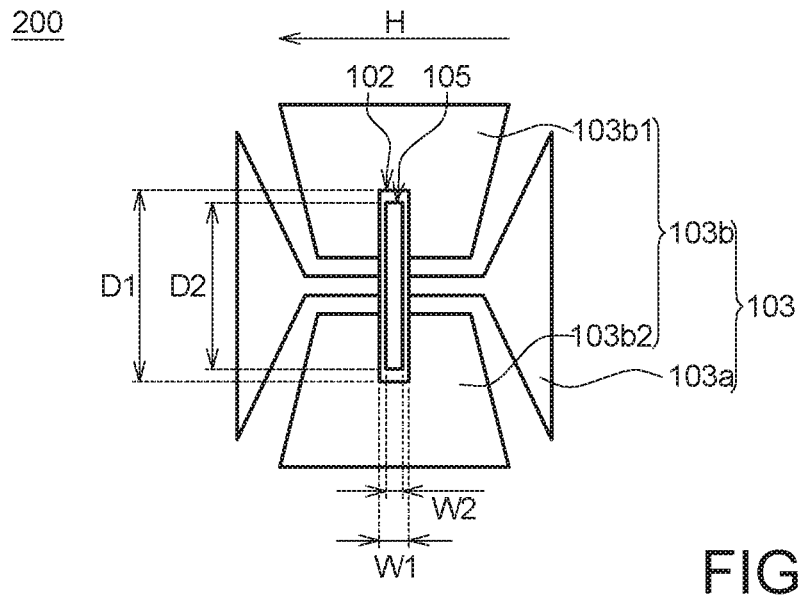
FIG. 2A is a partial top view illustrating of a touch sensing structure manufactured by the method illustrated in FIGS. 1A to 1E according to an embodiment of the present disclosure.

For example, FIG. 2A is a top view illustrating part of a touch sensing structure 200A manufactured by the method described in FIGS. 1A to 1E according to an embodiment of the present disclosure. In the present embodiment, the top view is taken from the top of the touch sensing structure 200A along a direction P normal to the transparent substrate 101. The first length (D1) and the first width (W1) of the patterned light-shielding layer 102 are substantially larger than or equal to the second length (D2) and the second width (W2) of the conductive bridge 105 respectively. It means that the patterned light-shielding layer 102 completely overlaps the conductive bridge 105, and the external light L passing through the transparent substrate 101 can be completely shielded by the patterned light-shielding layer 102 and will not be reflected by the conductive bridge 105 (see FIG. 1E).

Figure 2B:
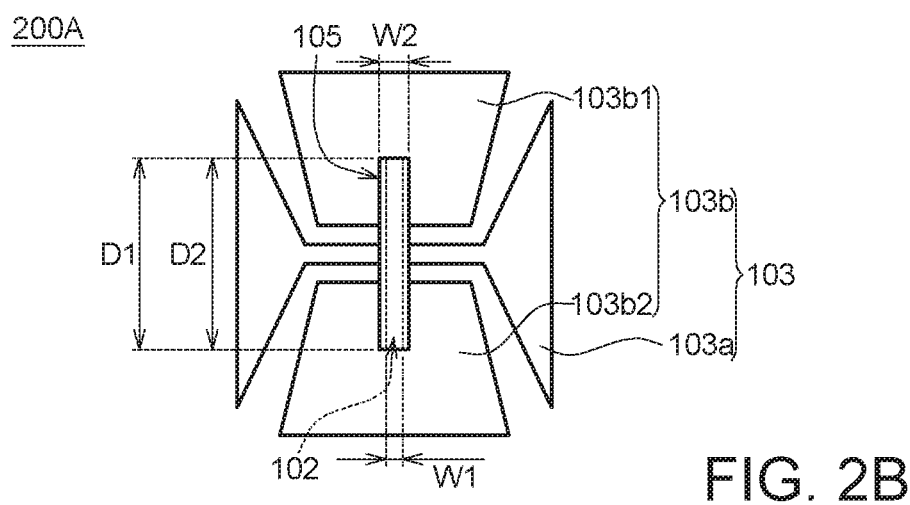
FIG. 2B is a partial top view of local area of a touch sensing structure manufactured by the method illustrated in FIGS. 1A to 1E according to another embodiment of the present disclosure.

FIG. 2B is a top view of illustrating part of a touch sensing structure 200B according to another embodiment of the present disclosure. In the present embodiment, the length (the first length D1) of the patterned light-shielding layer 102 is substantially equivalent to the length (the second length D2) of the conductive bridge 105, but the width (the first width W1) of the patterned light-shielding layer 102 is substantially smaller than the width (the second width W2) of the conductive bridge 105. It means that the patterned light-shielding layer 102 and the conductive bridge 105 completely overlap in a horizontal direction H, but the conductive bridge 105 does not be fully covered by the patterned light-shielding layer 102 to entirely block the external light (not shown) passing through the transparent substrate 101 from reaching to the conductive bridge 105. Therefore, a portion of the external light (not shown) passing through the transparent substrate 101 may reach to the conductive bridge 105 and then be reflected by the conductive bridge 105. In the present embodiment, the ratio of the roof square of the top surface of the conductive bridge 105 not overlapped with the patterned light-shielding layer 102 to the roof square of the top surface of the conductive bridge 105 is substantially between 40%~70%. In other words, the roof square of the conductive bridge 105 and that of the patterned light-shielding layer 102 are different when viewed along the direction P normal to the transparent substrate 101.

Figure 2C:
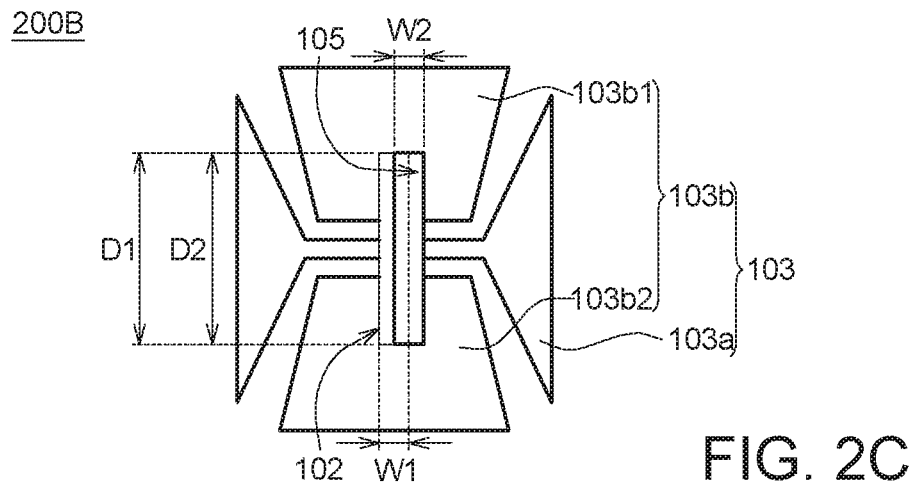
FIG. 2C is a partial top view of a touch sensing structure manufactured by the method illustrated in FIGS. 1A to 1E according to another embodiment of the present disclosure.

FIG. 2C is a top view illustrating part of a touch sensing structure 200C according to another embodiment of the present disclosure. In the present embodiment, the length (the first length D1) and the width (the first width W1) of the patterned light-shielding layer 102 are substantially equivalent to the length (the second length D2) and the width (the second width W2) of the conductive bridge 105a respectively. However, the patterned light-shielding layer 102 is not exactly aligned with the conductive bridge 105a, the lateral sides of the patterned light-shielding layer 102 deviate from that of the conductive bridge 105a in a horizontal direction H, and the patterned light-shielding layer 102 and the conductive bridge 105a only partly overlap. The roof square of the top surface of the conductive bridge 105a not overlapping with the patterned light-shielding layer 102 to the roof square of the top surface of the conductive bridge 105a is substantially less than 50%. In a preferred embodiment, the width of the conductive bridge 105 is about 3~10 μm. Each of the lateral sides of the patterned light-shielding layer 102 deviates from the corresponding one of the conductive bridge 105 about 1.5~5 μm in the horizontal direction H. Additionally, when the length and the width of the patterned light-shielding layer 102 are not equivalent to that of the conductive bridge 105, the ratio of the unshielded portion of the conductive bridge 105 to the whole roof square of the conductive bridge 105 is substantially less than 50%. For providing clear description to the above embodiments, the dielectric layer 104 is not illustrated in the top views of FIGS. 2A to 2C.

Figure 3A:
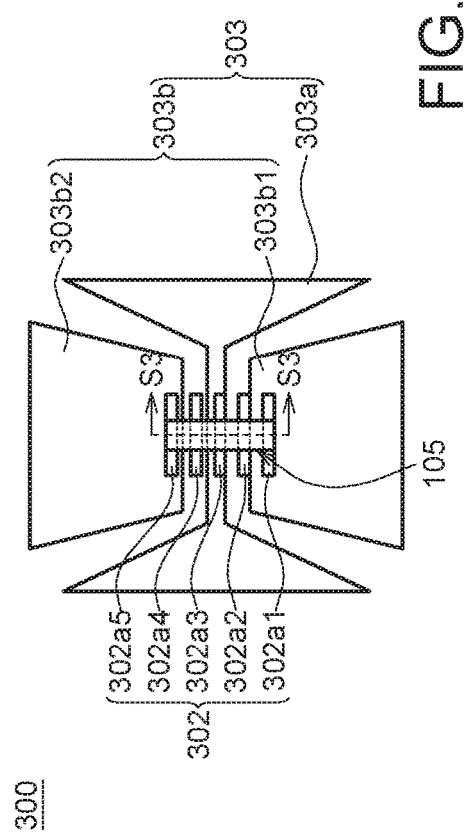
FIG. 3A is a partial top view of a touch sensing structure manufactured by the method illustrated in FIGS. 1A to 1E according to another embodiment of the present disclosure.
Figure 3B:
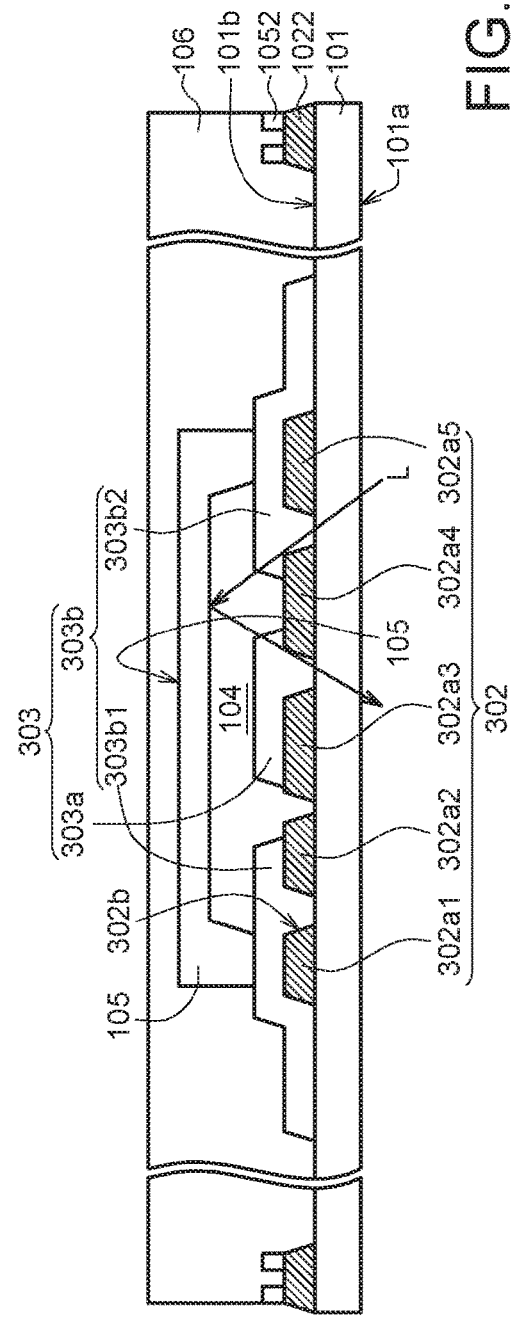
FIG. 3B is a cross-sectional view illustrating part of the touch sensing structure taken along the cutting line S3 depicted in FIG. 3A.

Referring to FIG. 3A and FIG. 3B. FIG. 3A is a top view illustrating part of a touch sensing structure 300 according to another embodiment of the present disclosure. FIG. 3B is a cross-sectional view illustrating part of the touch sensing structure 300 taken along the cutting line S3 depicted in FIG. 3A. The structure of the touch sensing structure 300 is similar to that of the touch sensing structure 100 except that the patterned light-shielding layer 302 of the touch sensing structure 300 includes at least one (i.e. one or more than one) opening 302b. In the present embodiment, the patterned light-shielding layer 302 is divided into several spatially separated light-shielding portions, such as the light-shielding portions 302a1, 302a2, 302a3, 302a4 and 302a5, and a plurality of openings 302b are defined between two adjacent ones of the light-shielding portions 302a1, 302a2, 302a3, 302a4 and 302a5.

Each of the light-shielding portions 302a1, 302a2, 302a3, 302a4 and 302a5 at least partly overlaps the conductive bridge 105a. Since the light-shielding portions 302a1, 302a2, 302a3, 302a4 and 302a5 do not shield the whole roof square of the conductive bridge 105 to block the external light L passing through the transparent substrate 101 and from reaching to the conductive bridge 105. Thus, still a portion of the external light L can reach to the conductive bridge 105 and then be reflected by the conductive bridge 105. In the present embodiment, the ratio of the roof square of the top surface of the conductive bridge 105a not overlapping with the patterned light-shielding layer 302 to the roof square of the top surface of the conductive bridge 105a is substantially between 40%~50% (as shown in FIG. 3B). In other words, the ratio of the exposed area of the conductive bridge 105a is between 40%~50%.

As discussed above, the patterned light-shielding layer 302 has a plurality of openings 302b formed thereon. When a patterned electrode layer 303 including a first patterned electrode 303 and a second patterned electrode 303b is subsequently formed on the patterned light-shielding layer 302. The first patterned electrode 303a, the second patterned electrode 303b or both of them may extend downwards and passing through the openings 302b and in contact with the inner surface 101b of the transparent substrate 101 (as shown in FIG. 3B). Similarly, for providing clear description to the above embodiments, the dielectric layer 104 is not illustrated in the top views of FIGS. 3A and 3B. The display quality of the display can benefit by the design of the light-shielding layer 302, because the presence of the openings 302b can prevent the patterned light-shielding layer 302 from completely shielding the sub-pixels of the display to block the light emitted from the sub-pixels. This approach may be more profitable to the display with high resolution, particularly when the size of the sub-pixels of the display with high resolution is smaller than the size of the patterned light-shielding layer 302. The presences of the openings 302b in the present embodiment can avoid the light emitted from the sub-pixels or some of the light rays having particular colors from being completely blocked.

Refer to FIG. 4A and FIG. 4B, FIG. 4A is a top view illustrating part of a touch sensing structure 400 according to another embodiment of the present disclosure. FIG. 4B is a cross-sectional view illustrating part of the touch sensing structure 400 taken along the cutting line S4 depicted in FIG. 4A. The touch sensing structure 400 is similar to the touch sensing structure 100 except the dimension of the light-shielding layer 402 of the touch sensing structure 400. In the present embodiment, the width of the patterned light-shielding layer 402 of the touch sensing structure 400 is substantially larger than that of the conductive bridge 105a and the length of the patterned light-shielding layer 402 is substantially smaller than that of the conductive bridge 105 (see FIG. 4A).

In the present embodiment, the conductive bridge 105 does not laterally extend beyond the patterned light-shielding layer 402 in the horizontal direction H. However, two ends of the conductive bridge 105 extend beyond the patterned light-shielding layer 402 along the direction parallel to the long axis of the conductive bridge 105. The ratio of the roof square of the conductive bridge 105a not overlapping with the patterned light-shielding layer 402 to the roof square of the conductive bridge 105a is substantially between 20%~30%. The patterned light-shielding layer 402 cannot block all the external light (not shown) passing through the transparent substrate 101. Still a portion of the external light can reach to the conductive bridge 105 and then be reflected by the conductive bridge 105.

As shown in FIG. 4B, the patterned light-shielding layer 402 is shorter than the conductive bridge 105, and the conductive bridge 105 extend beyond the patterned light-shielding layer 402 at the two ends of the long axis. When a patterned electrode layer 403 including a plurality of first patterned electrodes 403a and a plurality of second patterned electrode 403b is subsequently formed on the patterned light-shielding layer 402. The first patterned electrode 403a and the second patterned electrode 403b extends downward to cover the sidewalls of the patterned light-shielding layer 402 at the two ends of the long axis and in contact with the inner surface 101b of the transparent substrate 101 (as shown in FIG. 4B).

Figure 5:
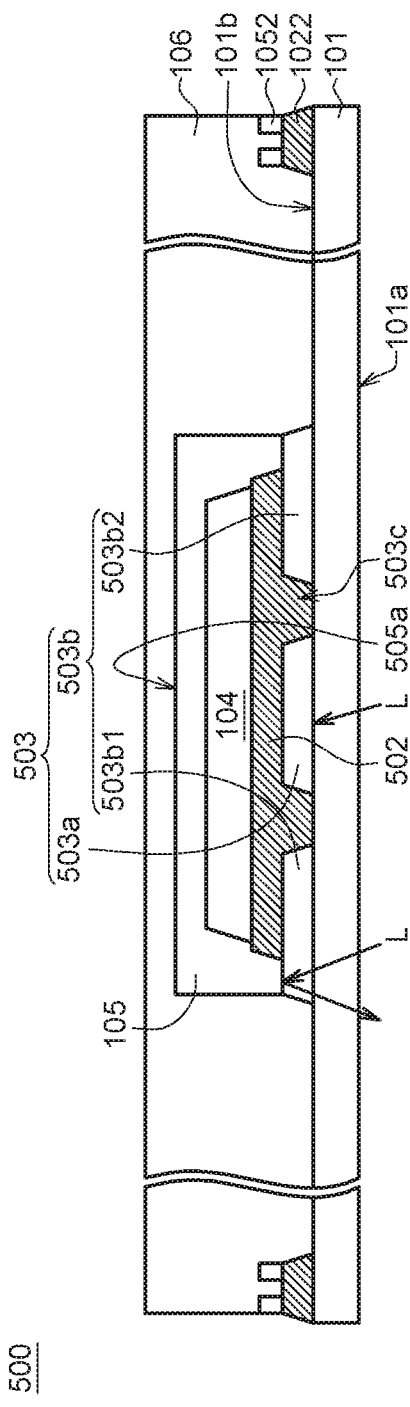
FIG. 5 is a cross-sectional view illustrating part of a touch sensing structure according to another embodiment of the present disclosure.

FIG. 5 is a cross-sectional view illustrating part of a touch sensing structure 500 according to another embodiment of the present disclosure. The touch sensing structure 500 is similar to the touch sensing structure 400 except the locations of the first patterned electrode 503a and the second patterned electrode 503b of the touch sensing structure 500. The first patterned electrode 503a and the second patterned electrode 503b of the touch sensing structure 500 are disposed between the inner surface 101b of the transparent substrate 101 and the patterned light-shielding layer 502; and the patterned electrode layer 503 of the touch sensing structure 500 directly contacts the inner surface 101b of the transparent substrate 101. Additionally, a single-layer or multi-layer film (not shown) can be disposed between the patterned electrode layer 503 and the transparent substrate 101, wherein the single-layer or multi-layer film can be made of an organic material such as a high temperature resistant organic material (higher than 200° C.) or an inorganic material such as silicon oxide (SiOx) or silicon nitride (SiNx) to increase the transmittance or strength of the glass.

In the present embodiment, the relative positions between the first patterned electrode 503a, the second patterned electrode 503b, the transparent substrate 101 and the patterned light-shielding layer 502 of the touch sensing structure 500 are different from that of corresponding structures of the touch sensing structure 400. The step sequence for forming the touch sensing structure 500 is thus different from that for forming the touch sensing structure 400. The method for forming the touch sensing structure 500 includes following steps. Firstly, the patterned electrode layer 503 with the first patterned electrode 503a and the second patterned electrode 503b is formed on the inner surface 101b of a transparent substrate 101. Then, a patterned light-shielding layer 502, a dielectric layer 104, a conductive bridge 505 and a protection layer 106 are formed in sequence on the patterned electrode layer 503. A light-shielding pattern 1022 capable of shielding several metal traces 1052 can be formed on the transparent substrate 101 by the same process for forming the patterned light-shielding layer 502. The metal traces 1052 can be electrically connected with the first patterned electrode 503a and the second patterned electrode 503b respectively.

There is at least one gap 503c formed between the first patterned electrode 503a and the second patterned electrode 503b of the patterned electrode layer 503. In the present embodiment, there are two gaps 503c formed between the first patterned electrode 503a and the second patterned electrode 503b. One is formed between the first patterned electrode 503a and a first portion 503b1 of the second patterned electrode 503b, and the other is formed between the first patterned electrode 503a and a second portion 503b2 of the second patterned electrode 503b. The patterned light-shielding layer 502 formed on the patterned electrode layer 503 may partially extend downwards and passing through the gap 503c to contact the inner surface 101b of the transparent substrate 101.

In the present embodiment, the conductive bridge 505 crosses over the patterned light-shielding layer 502 and the two ends of the conductive bridge 505 electrically contact with the first portion 503b1 and the second portion 503b of the second patterned electrode 503b that is disposed under the patterned light-shielding layer 502. The conductive bridge 505 and the second patterned electrode 503b both extend beyond the patterned light-shielding layer 502 at the two ends of the long axis of conductive bridge 505. The two ends of the conductive bridge 505 thus can extend downwards to cover the sidewalls of the dielectric layer 104 and the patterned light-shielding layer 502, as well as to contact with the first portion 503b1 and the second portion 503b of the second patterned electrode 503b respectively.

The patterned light-shielding layer 502 is defined by lithography process, and the resulted patterned light-shielding layer 502 may have a cross-section profile with smooth gradient sidewalls gradually flared from bottom to top at the two ends of the long axis in accordance with the nature of the lithography process. When the thickness of the conductive bridge 505 is decreased the electrical connection formed between the conductive bridge 505, the first portion 503b1 of the second patterned electrode 503b and the connecting portion 505a1 of the second portion 503b may not be deteriorated Therefore, the process reliability of forming the conductive bridge 505 (the conductive bridge 505a) can be increased.

In some embodiments of the present disclosure, the insulation impedance of the patterned light-shielding layer 502 is similar to that of the dielectric layer 104, therefore the dielectric layer 104 can be selectively omitted, and the conductive bridge 505 can be directly formed on the patterned light-shielding layer 502.

Figure 6:
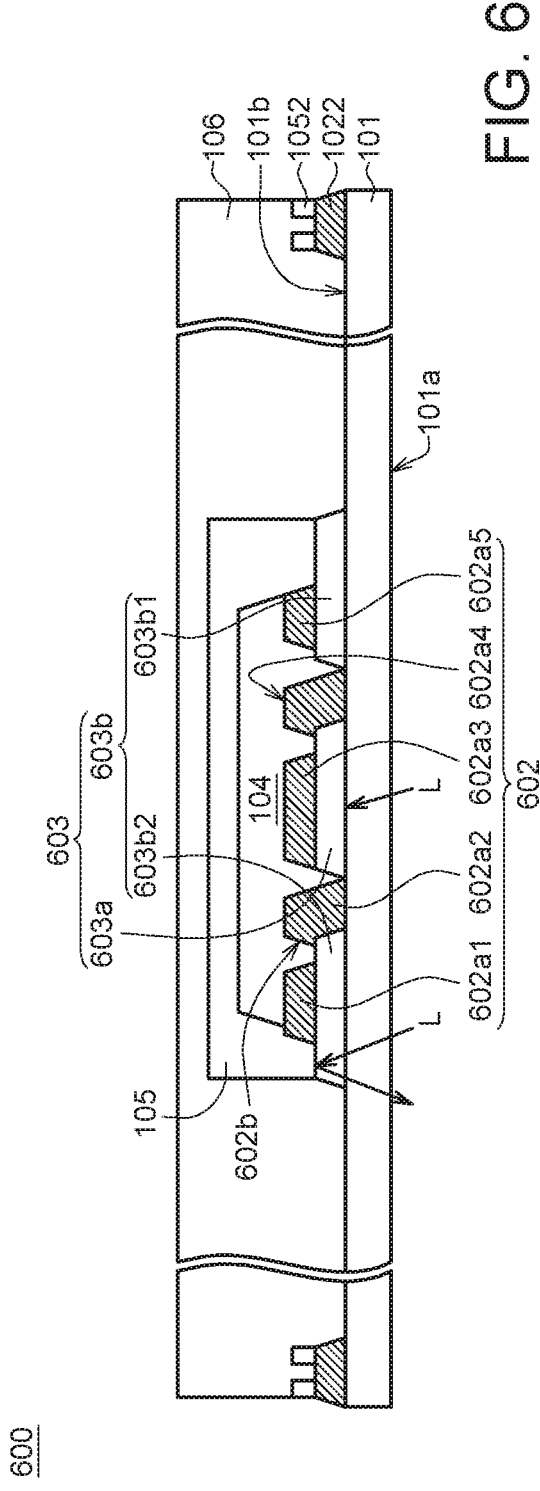
FIG. 6 is a cross-sectional view illustrating part a touch sensing structure according to another embodiment of the present disclosure.

FIG. 6 is a cross-sectional view illustrating part of a touch sensing structure 600 according to another embodiment of the present disclosure. The touch sensing structure 600 are similar to that of the touch sensing structure 300 except the locations of the first patterned electrode 603a and the second patterned electrode 603b of the touch sensing structure 600. The first patterned electrode 603a and the second patterned electrode 603b of the touch sensing structure 600 are disposed between an inner surface 101b of the transparent substrate 101 and the patterned light-shielding layer 602; and the patterned electrode layer 603 of the touch sensing structure 600 directly contacts the inner surface 101b of the transparent substrate 101.

In the present embodiment, the patterned light-shielding layer 602 of the touch sensing structure 600 is divided into several spatially separated light-shielding portions, such as the light-shielding portions 602a1, 602a2, 602a3, 602a4 and 602a5, and a plurality of openings 602b are defined between two adjacent ones of the light-shielding portions 602a1, 602a2, 602a3, 602a4 and 602a5. The light-shielding portions 602a1, 602a2, 602a3, 602a4 and 602a5 do not shield the whole roof square of the conductive bridge 105 to block the external light L passing through the transparent substrate 101 from reaching to the conductive bridge 105. Thus, still a portion of the external light L can reach to the conductive bridge 105 and then be reflected by the conductive bridge 105.

FIGS. 7A to 7D are partial cross-sectional views illustrating the processing structures for forming a touch sensing structure 700 according to another embodiment of the present disclosure. The touch sensing structure 700 is formed on the transparent substrate 711 of the light outputting surface of a display panel 71. The method for forming the touch sensing structure 700 includes following steps: Firstly, a patterned electrode layer 703 including a first patterned electrode 703a and a second patterned electrode 703b is formed on the surface 711a of the transparent substrate 711 farther away from the liquid crystal layer (see FIG. 7A).

Figure 7A:
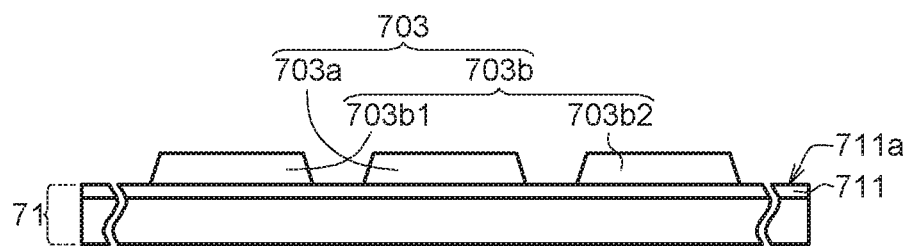
FIGS. 7A to 7D are series of partial cross-sectional views illustrating the processing structures for forming a touch sensing structure according to yet another embodiment of the present disclosure.
Figure 7B:
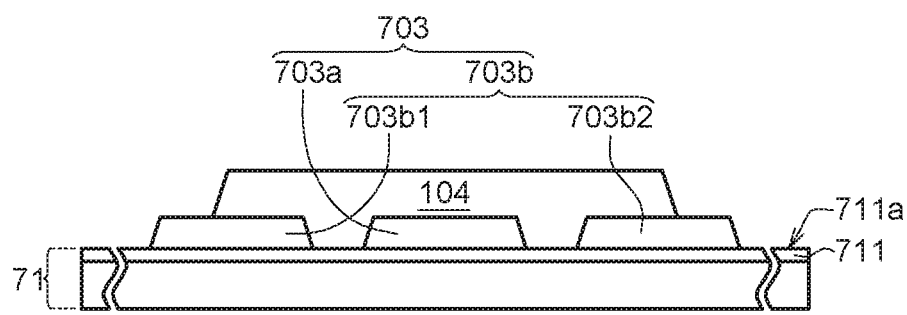

Then, a dielectric layer 104 is formed on the patterned electrode layer 703 to cover the first patterned electrode 703a and the second patterned electrode 703b and partly expose the first portion 703b1 and the second portion 703b2 of the second patterned electrode 703b (as shown in FIG. 7B).

Figure 7C:
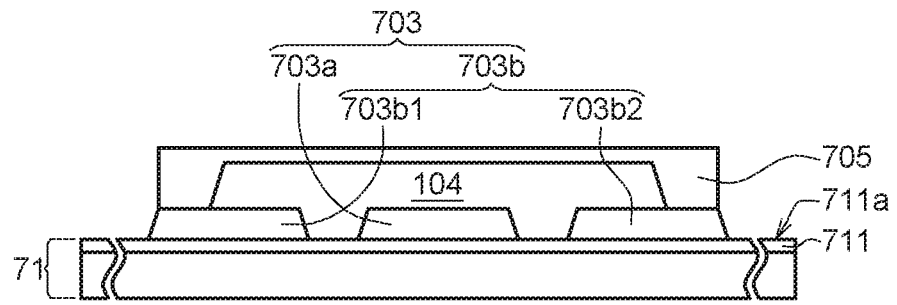

Then, a conductive bridge 705 is formed on the dielectric layer 104, to make the dielectric layer 104 disposed between the conductive bridge 705 and the first patterned electrode 703a, and to make the conductive bridge 705 electrically connected with the exposed first portion 703b1 and the second portion 703b2 of the second patterned electrode 703b. Wherein, the conductive bridge crossing over the first portion 703b1 and the second portion 703b2 of the second patterned electrode 703b (as shown in FIG. 7C).

Figure 7D:
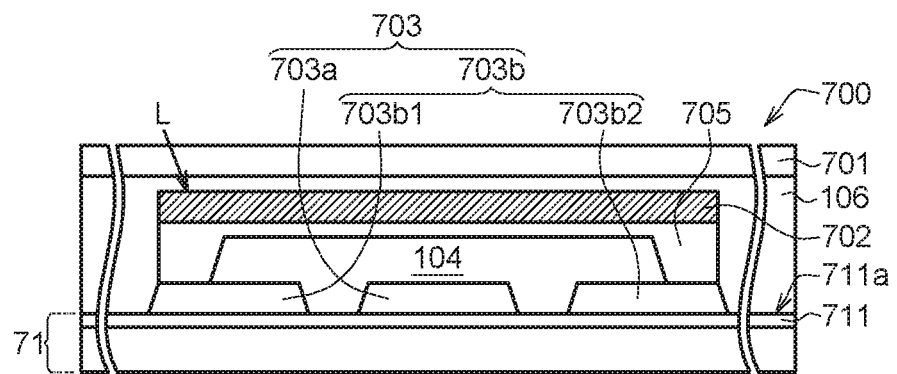

Then, a patterned light-shielding layer 702 is formed on the dielectric layer 104 in a manner of at least partly overlapping with the conductive bridge 705. Then, a glass substrate 701 (a transparent substrate) is provided to cover the patterned light-shielding layer 702, meanwhile the forming of the touch sensing structure 700 (as shown in FIG. 7D) is completed. In some embodiments of the present disclosure, an optional layer protection layer 106 can be coated on the patterned light-shielding layer 702. The process and components for forming the touch sensing structure 700 can be integrated with that for forming a display panel 71 to form a touch display apparatus 70. For example, the touch display apparatus 70 can be formed through series of downstream processes such as forming a protection layer, forming a functional optical film, connecting a circuit board or assembly, after the process for forming the touch sensing structure 700 is carried out.

In the present embodiment, the length and the width of the patterned light-shielding layer 702 are substantially larger than or equal to that of the conductive bridge 705 respectively; and the patterned light-shielding layer 702 completely overlaps the conductive bridge 705. The patterned light-shielding layer 702 can block the external light L passing through the transparent substrate 701 from reaching to the conductive bridge 705. Therefore, the external light L can be completely shielded by the patterned light-shielding layer 702 and will not be reflected by the conductive bridge 705.

Figure 8:
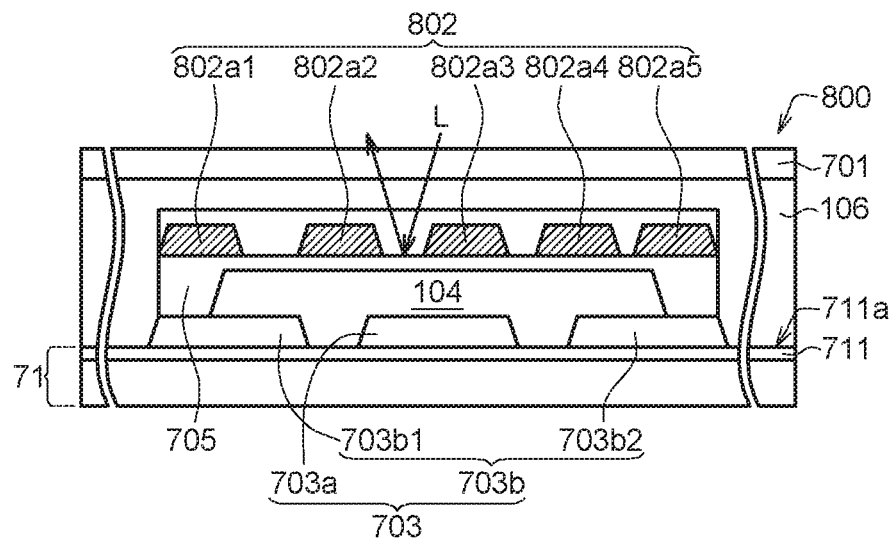
FIG. 8 is a cross-sectional view illustrating part of a touch sensing structure manufactured by the method described in FIGS. 7A to 7D according to another embodiment of the present disclosure.

FIG. 8 is a cross-sectional view illustrating part of a touch sensing structure 800 manufactured by the method described in FIGS. 7A to 7D according to another embodiment of the present disclosure. The touch sensing structure 800 are similar to the touch sensing structure 700 except the structure of the patterned light-shielding layer 802. The patterned light-shielding layer 802 of the touch sensing structure 800 is divided into several spatially separated light-shielding portions 802a1, 802a2, 802a3, 802a4 and 802a5, and a plurality of openings 802b are defined between two adjacent ones of the light-shielding portions 802a1, 802a2, 802a3, 802a4 and 802a5. In the present embodiment, each of the light-shielding portions 802a1, 802a2, 802a3, 802a4 and 802a5 at least partly overlaps the conductive bridge 705. However, the light-shielding portions 802a1, 802a2, 802a3, 802a4 and 802a5 do not shield the whole roof square of the conductive bridge 705 to block external light L passing through the glass substrate 701 from reaching to the conductive bridge 705. Therefore, still a portion of the external light L can reach to the conductive bridge 105 and then be reflected by the conductive bridge 705.

Figure 9:
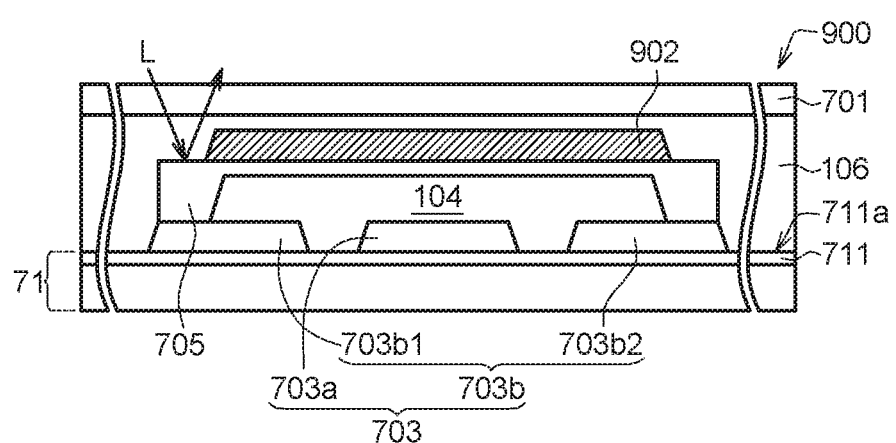
FIG. 9 is a cross-sectional view illustrating part of a touch sensing structure manufactured by the method described in FIGS. 7A to 7D according to another embodiment of the present disclosure.

FIG. 9 is a cross-sectional view illustrating part of a touch sensing structure 900 manufactured by the method described in FIGS. 7A to 7D according to another embodiment of the present disclosure. The touch sensing structure 900 are similar to the touch sensing structure 700 except the structure of the patterned light-shielding layer 902. The patterned light-shielding layer 902 of the touch sensing structure 900 is substantially shorter than the conductive bridge 705. In the present embodiment, the conductive bridge 705 completely overlaps the patterned light-shielding layer 902 in a horizontal direction (that is, in a direction parallel to the short axis of the conductive bridge 705a), but the two ends of the conductive bridge 705 do not overlap with the patterned light-shielding layer 902. In other words, the light-shielding layer 902 do not shield the whole roof square of the conductive bridge 705 to block external light L passing through the glass substrate 701 from reaching to the conductive bridge 705. Therefore, still a portion of the external light L can reach to the conductive bridge 705 and then be reflected by the conductive bridge 705.

Figure 10:
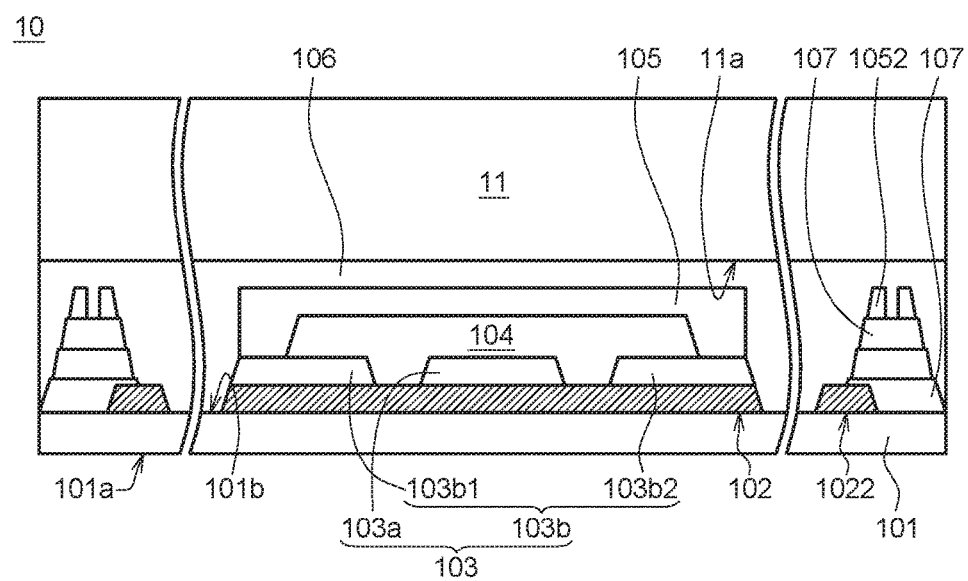
FIG. 10 is a cross-sectional view illustrating a touch display apparatus with touch function according to an embodiment of the present disclosure.

The touch sensing structure based on the a transparent substrate 101, for example the touch sensing structure 100, can be integrated with another display panel 11 to form a touch display apparatus 10 with touch function. Referring to FIG. 10, FIG. 10 is a cross-sectional view illustrating a touch display apparatus 10 with touch function according to an embodiment of the present disclosure. The touch sensing structure 100 of the touch display apparatus 10 is adjacent to the light outputting surface 11a of the display panel 11. In the present embodiment, the protection layer 106a of the touch sensing structure 100 is opposite to the light outputting surface 11a of the display panel 11.

The touch sensing structure 100 may include a patterned color light-shielding layer 107, which is formed on the periphery of the inner surface 101a of the transparent substrate 101 and surrounds the first patterned electrode 103a, the second patterned electrode 103b, the conductive bridge 105a and the patterned light-shielding layer 102. In some embodiments of the present disclosure, the color light-shielding layer 107 can be a multi-stacked layers structure made of white or color ink. Preferably, the patterned light-shielding layer 102 has an inner frame 1022 disposed on the inner side of the color light-shielding layer 107.

In the present embodiment, during the forming of the patterned light-shielding layer 102, a light-shielding pattern (hereinafter referred as 1022) can be formed outside the transparent substrate to serve as the inner frame of the touch sensing structure 100, and the color light-shielding layer 107 is formed subsequently. The color light-shielding layer 107 partly covers the light-shielding pattern 1022 and makes the light-shielding pattern 1022 adjacent to the color light-shielding layer 107. When viewed along the direction P normal to the transparent substrate 101 (top view), the inner frame defined by light-shielding pattern 1022 can be seen. A portion of the patterned metal layer 105 can be stacked on the color light-shielding layer 107 to form a plurality of metal traces 1052 (see FIG. 10). The metal traces 1052 can be electrically connected with the first patterned electrode 103a and the second patterned electrode 103b adopted by the same the touch sensing unit.

FIG. 11 is an exploded perspective view illustrating a touch display apparatus 10 according to an embodiment of the present disclosure. In some embodiments of the present disclosure, the display panel 11 of the touch display apparatus 10 has a plurality of sub-pixels 111, and at least one sub-pixel 111 overlaps with the touch sensing structure 100. The size of each sub-pixel 111 is 20 μm×60 μm, and the size of each patterned light-shielding layer 102 is 260 μm×10 μm. To reduce the area of the sub-pixel 111 shielded by the patterned light-shielding layer 102, the long axis 111a of the sub-pixel 111 forms a non-flat angle θ with the long axis of the conductive bridge 105. In the present embodiment, the non-flat angle θ formed by the long axis 111a of the sub-pixel 111 and the long axis of the conductive bridge 105a ranges between 85°~90°. That is, if the long axis 111a of the sub-pixel 111 and the long axis of the conductive bridge 105a are arranged in an identical horizontal direction, most area of the sub-pixel 111 may be shielded by the conductive bridge 105a, and the display quality of the touch display apparatus 10 will be deteriorated by this approach.

Figure 12A:
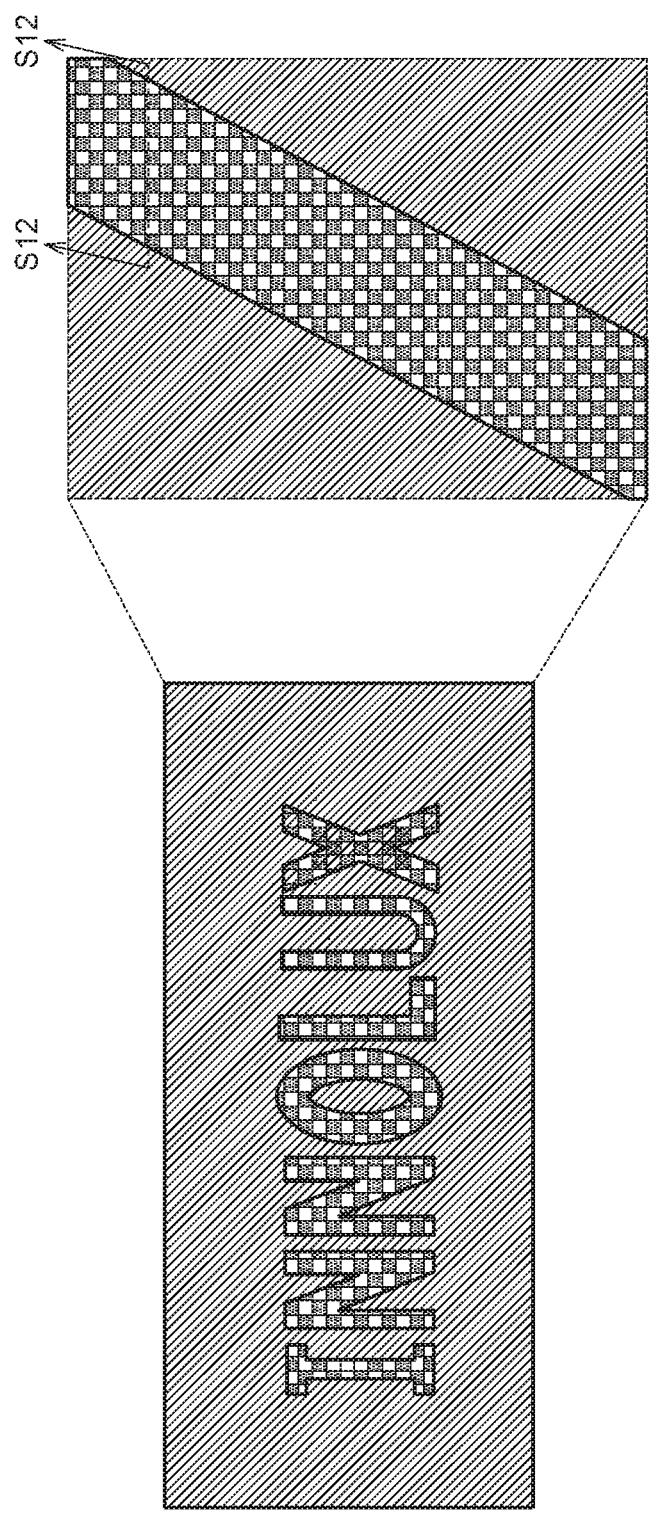
FIG. 12A is a top view illustrating a patterned display structure according to an embodiment of the present disclosure.
Figure 12B:
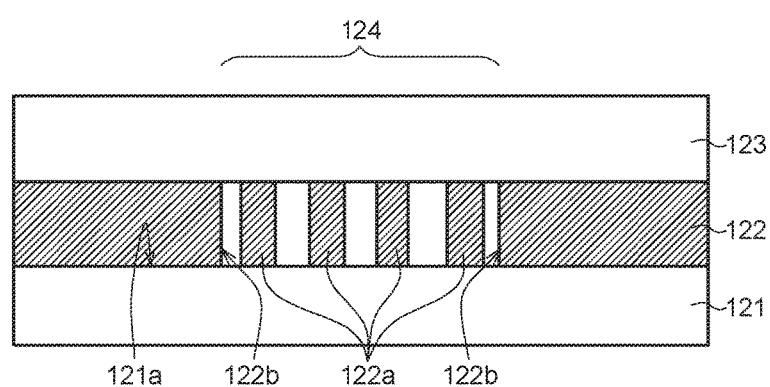
FIG. 12B is a cross-sectional view of the patterned display structure taken along the cutting line S12 depicted in FIG. 12A.

FIG. 12A is a top view illustrating a patterned display structure 120 according to an embodiment of the present disclosure. FIG. 12B is a cross-sectional view of the patterned display structure 120 taken along the cutting line S12 depicted in FIG. 12A. The patterned display structure 120 includes a metal layer 121 with a metal surface 121a, a photosensitive light shielding layer 122, and a cover lens 123 disposed on the photosensitive light shielding layer 122 (such as a reinforced glass substrate or a plastic substrate). In other words, the photosensitive light shielding layer 122 is firstly disposed on the cover lens 123, and then the metal layer 121 is sequentially disposed on the photosensitive light shielding layer 122. After the photosensitive light shielding layer 122 is patterned, a plurality of openings 122b are formed in the photosensitive light shielding layer 122, and the photosensitive light shielding layer 122 is divided into a plurality of light-shielding portions 122a. The openings 122b can expose a portion of the metal surface 121a to define at least one display pattern 124 on the photosensitive light shielding layer 122. The radial dimension of each light-shielding portion 122a is substantially smaller than 100 micrometers (μm). The metal layer 121 just covers on the portions of the photosensitive light shielding layer 122 corresponding to the openings 122b and the light-shielding portions 122a. However, the structure depicted in FIG. 12B is only illustrative. In some practical applications, the metal layer 121 may fulfill the plurality of openings 122b. The photosensitive light shielding layer 122 can be realized by the light-shielding pattern 1022 as disclosed in above embodiments. The display pattern 124 can be trademarks, texts, floral patterns, and so on, and is not subjected to specific restrictions.

In the present embodiment, the photosensitive light shielding layer 122 can be realized by a patterned photoresist layer, such as a black matrix. The method for forming the patterned display structure 120 includes following steps. Firstly, a photoresist coating layer (the photosensitive light shielding layer 122) can be formed on the surface 121a of the metal layer by way of coating, press-printing or other suitable method. Then, a lithography process is performed to remove a portion of the photoresist coating layer to expose a portion of the surface 121a of the metal layer and define a display pattern 124. At the same time the portions of the photosensitive light shielding layer 122 left in the display pattern 124 may serve as the light-shielding portions 122a.

The shape of each light-shielding portion 122a can be regular or irregular to meet the design needs of the display pattern 124 of the patterned display structure 120. For example, each light-shielding portion 122a can be a circle, a rectangle, a triangle, a polygon or other irregular shapes. Through the adjustment in the size or shape of the openings 122b in different regions, the brightness of the display pattern 124 can be adjusted by controlling the volume of the light reflected to the display pattern 124 from the surface 121a of the metal layer.

As discussed above, a touch sensing structure and a touch display apparatus using the same are provided in the embodiments of the present disclosure. A patterned light-shielding layer is disposed between an inner surface of a transparent substrate (cover lens) and a conductive bridge of a touch sensing electrode in a manner of at least partly overlapping the conductive bridge to block an external light passing through the transparent substrate from reaching to and being reflected by the conductive bridge. Though adjusting the overlapping position and overlapping size between the conductive bridge and the patterned light-shielding layer, the problems of bright spots due to the reflection of the external light can be mitigated, and the display quality of the touch display apparatus can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing structure, comprising:
    a transparent substrate; and
    at least one touch sensing unit disposed on the transparent substrate, wherein the touch sensing unit comprises:
        a first patterned electrode;
        a second patterned electrode includes a first portion and a second portion separated from the first portion, wherein the first portion and the second portion are separated by the first patterned electrode;
        a conductive bridge electrically connecting with the first portion and the second portion, and spatially insulated from the first patterned electrode; and
        a patterned light-shielding layer disposed between the conductive bridge and the transparent substrate and overlapping the conductive bridge, wherein the patterned light-shielding layer comprises a plurality of light-shielding portions arranged separately, and each light-shielding portion at least partly overlaps the conductive bridge.

2. The touch sensing structure according to claim 1, further comprising a patterned dielectric layer disposed between the patterned light-shielding layer and the conductive bridge, wherein the patterned light-shielding layer has a length larger than that of the dielectric layer.

3. The touch sensing structure according to claim 1, wherein the first patterned electrode and the second patterned electrode are disposed between the conductive bridge and the patterned light-shielding layer.

4. The touch sensing structure according to claim 1, wherein the first patterned electrode and the second patterned electrode are disposed between the conductive bridge and the transparent substrate.

5. A touch display apparatus, comprising:
    the touch sensing structure according to any of claim 1; and
    a display panel disposed on one side of the touch sensing structure.

6. The touch display apparatus according to claim 5, further comprising a patterned dielectric layer disposed between the patterned light-shielding layer and the conductive bridge, wherein the patterned light-shielding layer has a length larger than that of the dielectric layer.

7. The touch display apparatus according to claim 5, wherein the first patterned electrode and the second patterned electrode are disposed between the conductive bridge and the patterned light-shielding layer.

8. The touch display apparatus according to claim 5, wherein the first patterned electrode and the second patterned electrode are disposed between the conductive bridge and the transparent substrate.

9. The touch display apparatus according to claim 5, wherein the display panel comprises at least one sub-pixel having a long axis, and the angle formed by the long axis of the sub-pixel and a long axis of the conductive bridge is between 85°~90°.

* * * * *